US010437995B2

(12) United States Patent
Mořkovský

(10) Patent No.: US 10,437,995 B2
(45) Date of Patent: Oct. 8, 2019

(54) SYSTEMS AND METHODS FOR INFERENCE OF MALWARE LABELS IN A GRAPH DATABASE

(71) Applicant: Avast Software s.r.o., Prague (CZ)

(72) Inventor: Libor Mořkovský, Křemže (CZ)

(73) Assignee: AVAST SOFTWARE S.R.O., Prague (CZ)

( * ) Notice: Subject to any disclaimer, the term of this patent is extended or adjusted under 35 U.S.C. 154(b) by 365 days.

(21) Appl. No.: 15/474,007

(22) Filed: Mar. 30, 2017

(65) Prior Publication Data
US 2017/0286677 A1    Oct. 5, 2017

Related U.S. Application Data

(60) Provisional application No. 62/316,147, filed on Mar. 31, 2016.

(51) Int. Cl.
*G06F 21/56*     (2013.01)
*G06N 5/04*      (2006.01)
*G06F 16/22*     (2019.01)
*G06F 16/23*     (2019.01)

(52) U.S. Cl.
CPC ............ *G06F 21/562* (2013.01); *G06F 16/22* (2019.01); *G06F 16/2379* (2019.01); *G06N 5/04* (2013.01)

(58) Field of Classification Search
CPC .... G06F 21/562; G06F 16/2379; G06F 16/22; G06N 5/04
See application file for complete search history.

(56) References Cited

U.S. PATENT DOCUMENTS

| 8,811,188 B1* | 8/2014 | Bagchi ................. H04L 9/0822 370/241 |
| 9,942,252 B1* | 4/2018 | Kondaveeti ......... H04L 63/1416 |
| 10,198,576 B2* | 2/2019 | Vejmelka .............. G06F 21/564 |
| 2012/0278261 A1* | 11/2012 | Lin ........................ G06N 5/003 706/12 |
| 2012/0323829 A1* | 12/2012 | Stokes ................. G06F 21/563 706/12 |
| 2014/0165195 A1* | 6/2014 | Brdiczka ............... G06F 21/552 726/23 |
| 2015/0135261 A1* | 5/2015 | Park ...................... H04L 63/102 726/1 |

(Continued)

OTHER PUBLICATIONS

Long, Alexander et al., "Detecting Malware Samples with Similar Image Sets", VizSec'14, Nov. 10, 2014, Paris, France, pp. 88-95. (Year: 2014).*

(Continued)

*Primary Examiner* — Michael Pyzocha
(74) *Attorney, Agent, or Firm* — Husch Blackwell LLP

(57) ABSTRACT

Systems and methods are described which integrate file properties that in conventional systems has been considered weaker evidence of malware and analyzes the information to produce reliable results. Properties such as file paths, file names, source domains, IP protocol ASNs, section checksums, digital signatures that are not always present and not always reliable can be integrated into the classification process using a graph. A 1-neighborhood of object values in the graph may be created and analyzed to suggest a malware family label based on files having similar properties.

10 Claims, 3 Drawing Sheets

(56) References Cited

U.S. PATENT DOCUMENTS

2017/0011091 A1* 1/2017 Chehreghani .......... G06F 16/22

OTHER PUBLICATIONS

Dong et al., Knowledge vault: a web-scale approach to probabilistic knowledge fusion, http://dl.acm.org/citation.cfm?doid=2623330.2623623, ACM Digital Library, Accessed Jun. 26, 2017.
Rajab et al., CAMP: Content-Agnostic Malware Protection, http://www.cs.jhu.edu/~moheeb/aburajab-ndss-13.pdf, Google Inc., Accessed Jun. 26, 2017.
Melamid et al., Community Structure in Multi-Mode Networks: Applying an Eigenspectrum Approach, Connections, Jul. 2013, pp. 18-23, vol. 33, Issue 1.

* cited by examiner

SYSTEMS AND METHODS FOR INFERENCE OF MALWARE LABELS IN A GRAPH DATABASE

CROSS-REFERENCE TO RELATED APPLICATIONS

This application claims priority to U.S. provisional application No. 62/316,147 filed Mar. 31, 2016 which is hereby incorporated by reference in its entirety.

FIELD

The disclosure relates generally to determining if a file contains malware, and more particularly, to systems and methods for inferring a malware label for a file using a graph database.

BACKGROUND

Malware, short for "malicious software," is software that can be used to disrupt computer operations, damage data, gather sensitive information, or gain access to private computer systems without the user's knowledge or consent. Examples of such malware include software viruses, Trojan horses, rootkits, ransomware, etc. A common mechanism used by malware developers is to embed the malware into a file that is made to appear desirable to user, or is downloaded and executed when the user visits a web site. For example, malware may be embedded into a software application that appears legitimate and useful. The user downloads the file, and when the file is opened, the malware within the file is executed. A file that contains malware can be referred to as a malicious file.

In the face of the growing threat of malware, many anti-malware software packages were developed to detect malware in a user's files. Upon detection, the anti-malware software may notify the user of the presence of the malware, and may automatically remove or quarantine the malware. Detecting malware can be a difficult task, because millions of new files are created every day.

In order to avoid detection by anti-malware software, sophisticated malware developers introduced polymorphism into their malware. Polymorphic malware refers to malware in which portions of the malware are automatically changed without changing the overall functioning of the malware. The polymorphic nature of the malware results in executable files in the same malware family that perform very similar operations or dump the same payload when executed in the target machine, but have different byte content. Thus, polymorphism makes it difficult to use the file contents directly to recognize a malware family or group the files on similarity.

BRIEF DESCRIPTION OF THE DRAWINGS

For a better understanding of the inventive subject matter, reference may be made to the accompanying drawings in which.

DETAILED DESCRIPTION

Figure 1:
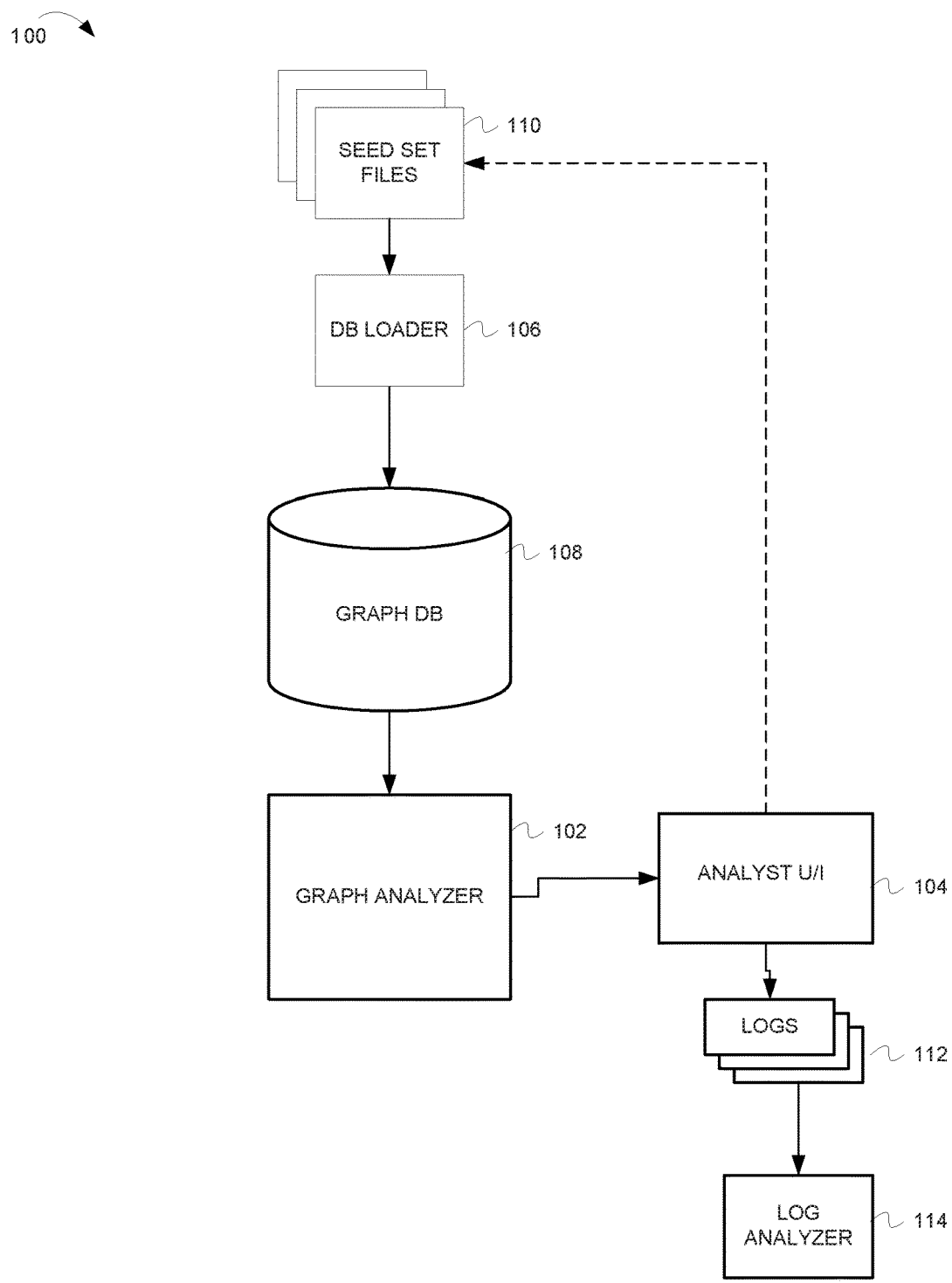
FIG. 1 is a block diagram illustrating an example system for inferring malware labels using a graph database.

In the following detailed description of example embodiments of the invention, reference is made to the accompanying drawings that form a part hereof, and in which is shown by way of illustration specific example embodiments in which the invention may be practiced. These embodiments are described in sufficient detail to enable those skilled in the art to practice the inventive subject matter, and it is to be understood that other embodiments may be utilized and that logical, mechanical, electrical and other changes may be made without departing from the scope of the inventive subject matter.

Some portions of the detailed descriptions which follow are presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, terms such as "processing" or "computing" or "calculating" or "determining" or "displaying" or the like, refer to the action and processes of a computer system, or similar computing device, that manipulates and transforms data represented as physical (e.g., electronic) quantities within the computer system's registers and memories into other data similarly represented as physical quantities within the computer system memories or registers or other such information storage, transmission or display devices.

In the Figures, the same reference number is used throughout to refer to an identical component that appears in multiple Figures. Signals and connections may be referred to by the same reference number or label, and the actual meaning will be clear from its use in the context of the description. In general, the first digit(s) of the reference number for a given item or part of the invention should correspond to the Figure number in which the item or part is first identified.

The description of the various embodiments is to be construed as examples only and does not describe every possible instance of the inventive subject matter. Numerous alternatives could be implemented, using combinations of current or future technologies, which would still fall within the scope of the claims. The following detailed description is, therefore, not to be taken in a limiting sense, and the scope of the inventive subject matter is defined only by the appended claims.

The systems and methods of the disclosure integrate file properties that in conventional systems has been considered weaker evidence of malware and analyzes the information to produce reliable results. Properties such as file paths, file names, source domains, IP protocol ASNs, section checksums, digital signatures are not always present and not always reliable. However, the systems and methods of the disclosure integrate such properties into the classification process, and can suggest a family label based on files having similar properties.

FIG. 1 is a block diagram illustrating an example system 100 for inferring malware labels using a graph database. In some aspects, system 100 includes a graph analyzer 102, an analyst user interface (U/I) 104, and a database loader 104. Graph database 108 is a seed object database storage device which contains data objects that represent files that have been loaded into the graph database 108. The graph analyzer 102 may be a processing circuit, such as that shown in FIG. 3, designed to analyze data objects as described below and may be a separate circuit or a portion of an integrated system.

Database loader 104 can be used to add seed objects representing a seed set of files 110 into graph database 108. In some aspects, the seed set of files 110 is a preselected group of files that share a characteristic and which are stored in suitable memory coupled to the database loader 104. For example, the seed set of files 1110 may be a selected group of files that are known or suspected of belonging include malware belonging to the same malware family or group. The files in the seed set of files 110 can have various properties associated with them. Examples of such properties include labels identifying viruses known to be in the files, file paths, file names, source domains, IP protocol ASNs, section checksums, digital signatures, hosting domains, IP addresses, referrers, registry key names etc. The files can have differing combinations of the above properties. The database loader 104 may be a processing circuit programmed to provide the seed objects from the seed set of files, and may be a separate device or a portion of an integrated system.

For each file, the database loader determines relevant properties for the file, and loads the properties into a graph database 108 as a tuple. In some aspects, the tuple is a tab separated text tuple having three fields: subject, predicate and value. The subject field comprises an object identifier. The object identified is an identifier assigned to the file. In some aspects, the object identifier is a hash of some or all of the content of a file. For example, the object identifier can be an SHA256 hash of the content of the file. The predicate field identifies a link type that links the object identifier to the value field. For example, assume that file metadata indicated that the file was obtained from an Internet host named "pirate_cove." A predicate of "source host" may be given a value of "pirate_cove" to indicate in the database where the subject file came from. In some aspects, there is a special predicate named "detected." The "detected" predicate links a file to a malware name or identifier. As will be further described below, the predicate "detected" may be given special treatment for classification purposes. In some aspects, all other predicates are treated equally.

As will be appreciated from the above, the tuples in the graph database may form a bipartite graph or network. That is, the subjects and the values exist in separate name spaces. As useful properties of a file are discovered, they can be easily added to the database using the above-describes schema without requiring any redesign of the schema or database. The predicate values can describe the new property and the value can be any of the values the property can take on.

After the graph database 108 has been loaded, graph analyzer 102 can analyze the tuples in the database and perform a facet aggregation query on the data to provide a faceted presentation via analyst U/I 104. The U/I 104 comprises a display and input device configured to allow a user to interact with the system 100 as described herein. Further details on the operation of graph analyzer 102 are provided below with reference to FIG. 2.

A user can use analyst U/I 104 to select a seed set of objects in graph database 108. For example, objects representing the seed set of files 110 can be selected as the seed set of objects. The analyst U/I 104 can also be used to make modifications to the seed set of objects. For example, a user can add subjects to the seed set of objects based on values found in the query results, or can filter out subjects that apparently don't belong in the seed set of objects. A log 112 of the operations performed by a user can be maintained by analyst U/I 104. A log analyzer 114 can analyze logs 112 and use machine learning techniques to learn rules or programs based on the operations found in the logs 112. The rules or programs can be applied to other seed set files or other sets of files.

Thus, a seed set of objects is a subset of the objects in graph database 108 that share a characteristic (e.g., belong to same malware family or group). The seed set of objects can be the starting point of an analysis session. The objects in the seed set can be changed, and the analysis can be repeated one or more times.

Figure 2:
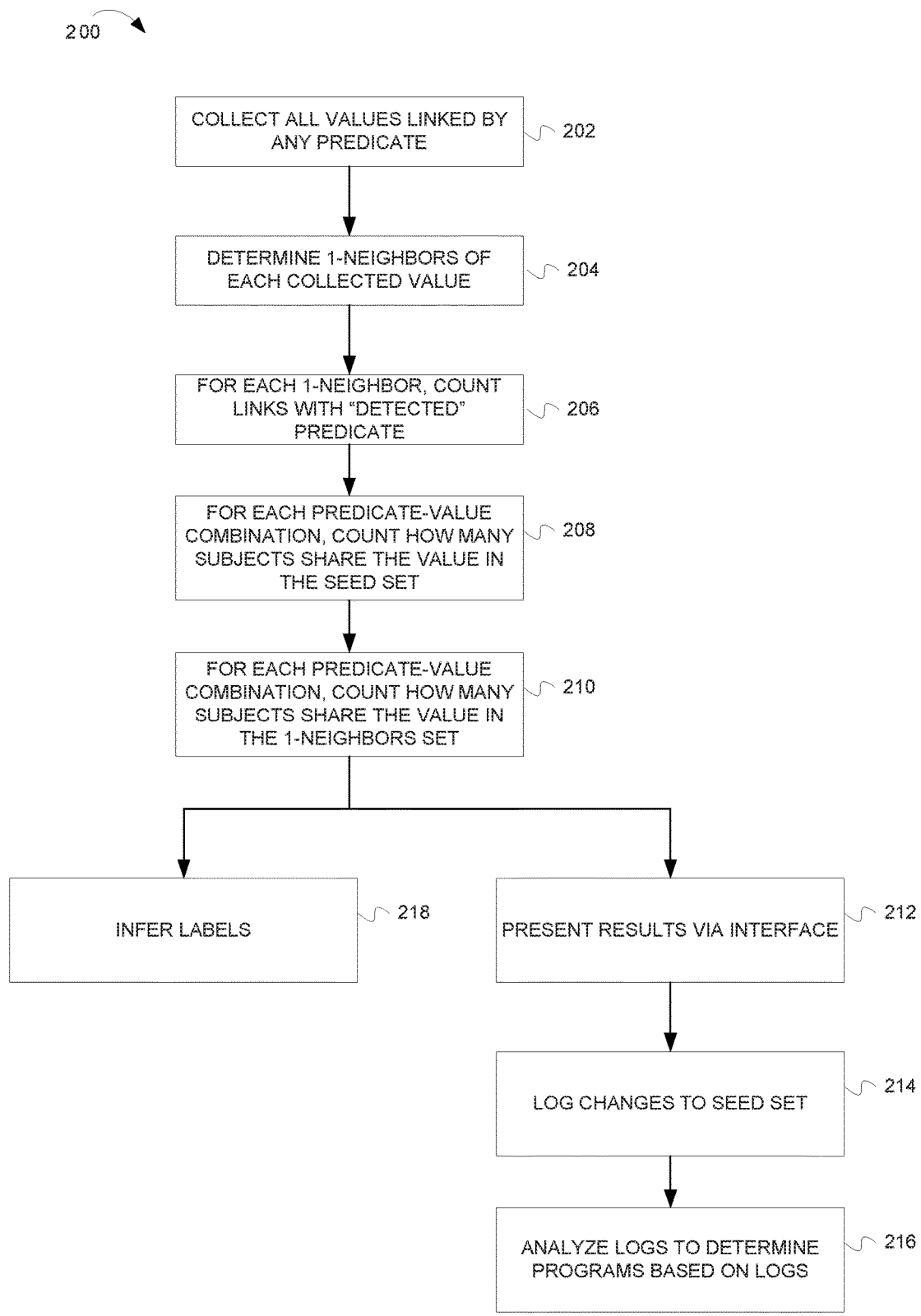
FIG. 2 is a flow chart illustrating operations of a method for inferring malware labels using a graph database.

FIG. 2 is a flow chart 200 illustrating operations of a method for inferring malware labels using a graph database.

At block 202, the values in the value field of the graph database that are linked by any predicate are collected.

At block 204, the graph analyzer 102 determines all of the 1-neighbors for each of the values collected at block 202 by traversing to all of the subjects linked by the value.

At block 206, for each of the subjects that are 1-neighbors of a value, the graph analyzer determines a count of the number of links with a "detected" predicate.

At block 208, for each predicate-value combination, the graph analyzer 102 determines a count of how many subjects share the value in the seed set files 110.

At block 210, for each predicate-value combination, the graph analyzer 102 determines a count of how many subjects share the value in the 1-neighbor set of the value.

The counts determined at blocks 208 and 210 can be used to determine characteristics of the seed set. For example, the count determined at block 208 represents the seed set. There can be values that are present but rare in the seed set group of objects and thus not indicative for the group. Another type of non-indicative value is a value that is shared by many objects in the seed set, but is also shared by many objects in the whole graph database 108. This is where the count determined at block 210 is useful by aggregating the total neighborhood of such a value. If the count is relatively large, it can indicate to the analyst or algorithm using the counts that this particular value, while popular in general, is not indicative of the current seed set of objects.

After blocks 202-210 have been performed, the graph analyzer 102 can proceed to either or both of blocks 212 and 218.

At block 212, the output of the query performed in blocks 202-210 is presented to a user via analyst U/I 104. The output can be in the form of a table. In some aspects, the table has columns representing the values in the tuples, and the counts determined above. In particular aspects, the table has the columns: value, predicate, n_in_seed, n_neighbors_detected, n_neighbors_total.

In some aspects, the table is presented to the user in the form of 'facets', where each group of rows for one predicate is sorted decreasingly on n_in_seed. Given the seed set files 110 are meaningfully chosen, this can bring up values shared by many members of the family. As discussed above, it can be useful to choose samples for the seed set where there is a high confidence of having the same characteristic. For example, files belonging to the same malware family/group as indicated by a byte pattern in the files, or file from the same malware distribution domain can be chosen. In alternative aspects, the groups of rows can each be sorted by a background coefficient such as a chi-square or Gini index. Sorting by such coefficients which take into account the background distribution and query set distribution of each value can be useful in revealing values that are potentially associated with malware, while still being prevalent enough in the seed file set 110.

At block 214, any changes to the seed file set 110 are logged to log 112. As noted above, such changes can include additions or removals from the seed file set 110 performed by a user as a result of analyzing the output provided at block 212.

At block 216, the logs produced at block 214 can be analyzed by log analyzer 114 and machine learning techniques can be applied to determine programs that can be automatically applied to the seed set files 110. The log analyzer module 114 may be suitable programmed processing circuitry, such as shown in FIG. 3, either separate or part of an integrated system.

In addition to, are as an alternative to, block 212-216, at block 218, the graph analyzer 102 can automatically infer labels. In some aspects, automatic label inference can be based on local subgraphs. After an object has been inserted into the full graph, a local subgraph can be constructed that is a graph containing 1-neighbors of all values of an object inserted into the seed set, and their respective values. Properties of the query subject are used to filter out a local dense subgraph for the subject. In the dense subgraph, all current or potential 'detected' edges are assigned a probability. In some aspects, the potential detection names are extracted from the subgraph as all values that are pointed at by an edge with the label (predicate) 'detected'. Potential 'detected' edges are all edges that connect the current query to all potential detection names, but have not materialized in the database yet. If the probability exceeds given sensitivity threshold, a new 'detected' edge tuple is created. In some aspects, a machine learning methodology can be used to determine the probability. For example, a model can be trained on some prior data, and given the local neighborhood, the model outputs the probability. In some aspects, a Path Ranking Algorithm that works similarly to association rule miners, or a model based on low rank decomposition of a tensor in combination with machine learning programs can be used. In some aspects, the probability threshold can depend on the machine learning algorithm used. Typically the output is mapped to a 0-1 interval. In such cases, the thresholds can be in the range of 0.5 to 0.8.

While the above discussion has been presented in the context of inferring malware labels for files, those of skill in the art having the benefit of the disclosure will appreciate that the label inference methodology described above can be useful in other application environments where objects can have volatile properties.

Figure 3:
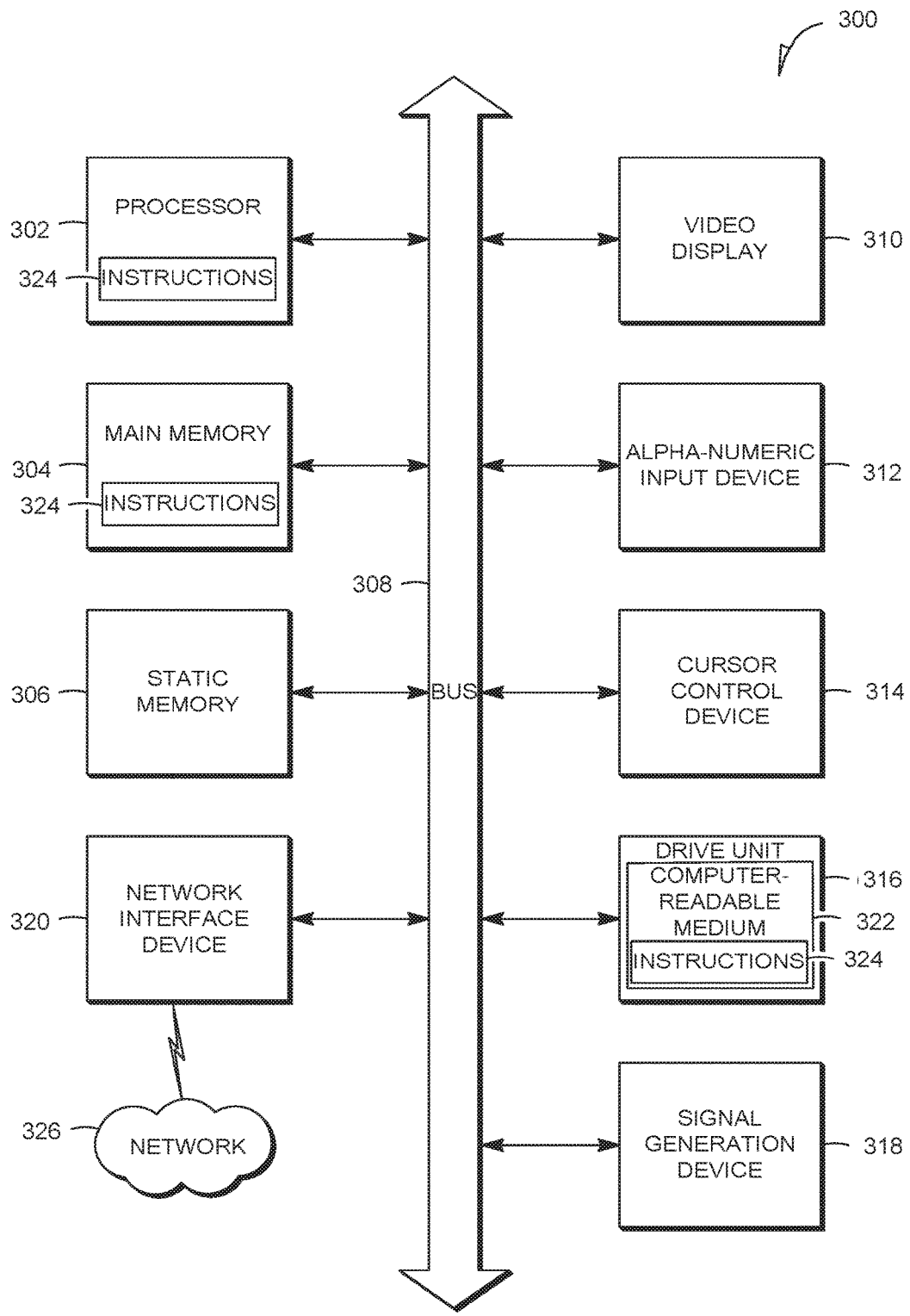
FIG. 3 is a block diagram of an example embodiment of a computer system upon which embodiments of the inventive subject matter can execute.

FIG. 3 is a block diagram of an example embodiment of a computer system 300 upon which embodiments of the inventive subject matter can execute. The description of FIG. 3 is intended to provide a brief, general description of suitable computer hardware and a suitable computing environment in conjunction with which the invention may be implemented. In some embodiments, the inventive subject matter is described in the general context of computer-executable instructions, such as program modules, being executed by a computer. Generally, program modules include routines, programs, objects, components, data structures, etc., that perform particular tasks or implement particular abstract data types.

As indicated above, the system as disclosed herein can be spread across many physical hosts. Therefore, many systems and sub-systems of FIG. 3 can be involved in implementing the inventive subject matter disclosed herein.

Moreover, those skilled in the art will appreciate that the invention may be practiced with other computer system configurations, including hand-held devices, multiprocessor systems, microprocessor-based or programmable consumer electronics, smart phones, network PCs, minicomputers, mainframe computers, and the like. Embodiments of the invention may also be practiced in distributed computer environments where tasks are performed by I/O remote processing devices that are linked through a communications network. In a distributed computing environment, program modules may be located in both local and remote memory storage devices.

With reference to FIG. 3, an example embodiment extends to a machine in the example form of a computer system 300 within which instructions for causing the machine to perform any one or more of the methodologies discussed herein may be executed. In alternative example embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. Further, while only a single machine is illustrated, the term "machine" shall also be taken to include any collection of machines that individually or jointly execute a set (or multiple sets) of instructions to perform any one or more of the methodologies discussed herein.

The example computer system 300 may include a processor 302 (e.g., a central processing unit (CPU), a graphics processing unit (GPU) or both), a main memory 304 and a static memory 306, which communicate with each other via a bus 308. The computer system 300 may further include a video display unit 310 (e.g., a liquid crystal display (LCD) or a cathode ray tube (CRT)). In example embodiments, the computer system 300 also includes one or more of an alpha-numeric input device 312 (e.g., a keyboard), a user interface (UI) navigation device or cursor control device 314 (e.g., a mouse), a disk drive unit 316, a signal generation device 318 (e.g., a speaker), and a network interface device 320.

The disk drive unit 316 includes a machine-readable medium 322 on which is stored one or more sets of instructions 324 and data structures (e.g., software instructions) embodying or used by any one or more of the methodologies or functions described herein. The instructions 324 may also reside, completely or at least partially, within the main memory 304 or within the processor 302 during execution thereof by the computer system 300, the main memory 304 and the processor 302 also constituting machine-readable media.

While the machine-readable medium 322 is shown in an example embodiment to be a single medium, the term "machine-readable medium" may include a single medium or multiple media (e.g., a centralized or distributed database, or associated caches and servers) that store the one or more instructions. The term "machine-readable medium" shall also be taken to include any tangible medium that is capable of storing, encoding, or carrying instructions for execution by the machine and that cause the machine to perform any one or more of the methodologies of embodiments of the present invention, or that is capable of storing, encoding, or carrying data structures used by or associated with such instructions. The term "machine-readable storage medium" shall accordingly be taken to include, but not be limited to, solid-state memories and optical and magnetic media that can store information in a non-transitory manner, i.e., media that is able to store information. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and CD-ROM and DVD-ROM disks.

The instructions 324 may further be transmitted or received over a communications network 326 using a signal transmission medium via the network interface device 320 and utilizing any one of a number of well-known transfer protocols (e.g., FTP, HTTP). Examples of communication networks include a local area network (LAN), a wide area network (WAN), the Internet, mobile telephone networks, Plain Old Telephone (POTS) networks, and wireless data networks (e.g., WiFi and WiMax networks). The term "machine-readable signal medium" shall be taken to include any transitory intangible medium that is capable of storing, encoding, or carrying instructions for execution by the machine, and includes digital or analog communications signals or other intangible medium to facilitate communication of such software.

Although an overview of the inventive subject matter has been described with reference to specific example embodiments, various modifications and changes may be made to these embodiments without departing from the broader spirit and scope of embodiments of the present invention. Such embodiments of the inventive subject matter may be referred to herein, individually or collectively, by the term "invention" merely for convenience and without intending to voluntarily limit the scope of this application to any single invention or inventive concept if more than one is, in fact, disclosed.

As is evident from the foregoing description, certain aspects of the inventive subject matter are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the spirit and scope of the inventive subject matter. Therefore, it is manifestly intended that this inventive subject matter be limited only by the following claims and equivalents thereof.

The Abstract is provided to comply with 37 C.F.R. § 1.72(b) to allow the reader to quickly ascertain the nature and gist of the technical disclosure. The Abstract is submitted with the understanding that it will not be used to limit the scope of the claims.

What is claimed is:

1. A system for inferring a malware label comprising:
    a seed object database storage device including a seed object database which receives and stores a seed set of objects, the objects representing one or more files;
    a graph analyzer, coupled to the seed data storage device and to a user interface, which determines a graph from a plurality of values in the seed set of objects, the graph including a subject identifying an object of the seed set of objects linked to a value of the plurality of values by an predicate, determines a set of values that are linked by any predicate, traverses to the subject of the values in the sets of values to determine a set of 1-neighbors, for each subject that is a 1-neighbor to a value, determines a first count of the number of links indicating a detected malware value, and for each combination of predicate and value determines a second count of a number of subjects that share the value in the seed set of objects and determines a third count of a number of subjects that share the value in the 1-neighbor set of values;
    a user interface device that presents the first count, the second count, the third count and the value; and
    a communication link that couples a selection of a new object to the seed object database from the user interface to add to the seed set of objects.

2. The system of claim 1 further comprising a logging storage device for logging changes to the seed set of objects to one or more logs, and an analyzing module which analyses the one or more logs to determine one or more rules and apply the one or more rules to automatically determine a malware label for a file.

3. The system of claim 1 further comprising the graph analyzer determining a local sub-graph containing 1-neighbors of all values associated with the new object, assigning a probability to the predicates indicating a detected malware value in the 1-neighbors, and creating a new database entry for the new object having a predicate of detected in response to a probability exceeding a threshold value.

4. The system of claim 1 wherein the seed objects are loaded into the seed object database as a tuple having a subject field, a predicate field, and a value field, the tuples forming a bipartite network.

5. The system of claim 1 further comprising a seed file storage device which receives and stores a seed set of files and a database loader which adds seed objects representing the seed set of file into the seed object database.

6. A method for inferring a malware label, the method comprising:
    receiving and storing a seed set of objects in a seed object database, the objects representing one or more files;
    determining in a graph analyzer a graph from a plurality of values in the seed set of objects, the graph including a subject identifying an object of the seed set of objects linked to a value of the plurality of values by a predicate;
    determining by the graph analyzer a set of values that are linked by any predicate, the graph analyzer traversing to the subjects of the values in the set of values to determining a set of 1-neighbors;
    for each subject that is a 1-neighbor to a value, the graph analyzer determining a first count of the number of links indicating a detected malware value;
    for each combination of predicate and value, the graph analyzer determining a second count of a number of subjects that share the value in the seed set of objects;
    for each combination of predicate and values, the graph analyzer determining a third count of a number of subjects that share the value in the 1-neighbor set of the value;
    presenting the subject, the first count, the second count, the third count, and the value on a user interface; and
    receiving from the user interface a selection of a new object at the seed object database to add to the seed set of objects.

7. The method of claim 6, further comprising:
logging, in a logging storage device, changes to the seed set of objects to one or more logs;
analyzing in a log analysis module the one or more logs to determine one or more rules; and,
applying the one or more rules in a graph analyzer to automatically determine a malware label for a file.

8. The method of claim 6, further comprising:
determining in a graph analyzer a local sub-graph containing 1-neighbors of all values associated with the new object;
assigning a probability to the predicates indicating a detected malware value in the 1-neighbors; and
creating a new database entry for the new object having a predicate of detected in response to the probability exceeding a threshold value.

9. The method of claim 6 wherein objects are loaded with the seed object database as a tuple having a subject field, a predicate field, and a value field, the tuples forming a bipartite network.

10. The method of claim 6 further comprising receiving and storing a seed set of files in a seed file storage device and a database loader adding seed objects representing the seed set of file into the seed object database.

* * * * *